US006271885B2

(12) United States Patent
Sugiyama

(10) Patent No.: US 6,271,885 B2
(45) Date of Patent: *Aug. 7, 2001

(54) APPARATUS AND METHOD OF MOTION-COMPENSATED PREDICTIVE CODING

(75) Inventor: Kenji Sugiyama, Yokosuka (JP)

(73) Assignee: Victor Company of Japan, Ltd., Yokohama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/338,857

(22) Filed: Jun. 23, 1999

(30) Foreign Application Priority Data

Jun. 24, 1998 (JP) ................................... 10-177003

(51) Int. Cl.[7] ................................ H04N 7/12; H04B 1/66
(52) U.S. Cl. ................................ 348/402.1; 348/420.1; 375/240.16; 375/240.24
(58) Field of Search ................................... 348/397, 401, 348/402, 405, 408–411, 415, 416, 402.1, 420.1; 375/240.16, 240.24; 709/246

(56) References Cited

U.S. PATENT DOCUMENTS

| 5,103,307 | * | 4/1992 | Sugiyama | 358/136 |
|---|---|---|---|---|
| 5,315,326 | * | 5/1994 | Sugiyama | 358/415 |
| 5,337,086 | * | 8/1994 | Fujinami | 348/402 |
| 5,512,952 | * | 4/1996 | Iwamura | 348/416 |
| 5,715,005 | * | 2/1998 | Masaki | 348/416 |
| 5,729,690 | * | 3/1998 | Jeong et al. | 395/200.76 |
| 5,731,840 | * | 3/1998 | Kikuchi et al. | 348/416 |
| 5,748,784 | * | 5/1998 | Sugiyama | 382/236 |
| 5,748,787 | * | 5/1998 | Sugiyama | 382/240 |
| 5,912,706 | * | 6/1999 | Kikuchi et al. | 348/401 |

FOREIGN PATENT DOCUMENTS 0 556 507  10/1992 (EP).

OTHER PUBLICATIONS

Cheng–Tie et al. Visual Communication and Image Processing '91, Visual Communication, Boston, Nov. 11–13, 1991. "On Coding of Motion Vectors for Motion–Compensated Predictive/Interpolative Video Coder", pp. 812–821.

Yu, G. Y. et al. Proceedings of the International Conference on Image Processing, Washington, D.C., Oct. 23–26, 1995, vol. 23, Oct., 1995, "Two–Dimensional Motion Vector Coding for Low Bitrate Videophone Applications", pp. 414–417.

* cited by examiner

*Primary Examiner*—Russell Adams
*Assistant Examiner*—Rodney Fuller
(74) *Attorney, Agent, or Firm*—Anderson, Kill & Olick P. C.

(57) ABSTRACT

A moving picture signal is encoded by motion-compensated prediction using motion vectors for each motion-compensated block of the moving picture signal. The motion vectors are arranged into motion vector groups for each predetermined number of motion vectors. A code table is selected among a plurality of code tables for each motion vector group for encoding the motion vectors. Code table selection information is then output. The motion vectors is encoded by variable-length coding using the selected code table in accordance with the code table selection information. The code table selection information, the encoded motion vectors and an encoded predictive error signal are then multiplexed. A moving picture bit stream encoded as above is decoded. The moving picture bit stream is demultiplexed into the motion vectors, the code table selection information and the encoded predictive error signal. The motion vectors are then decoded by variable-length decoding using the code table selected in accordance with the code table selection information for decoding the predictive error signal by motion-compensated prediction.

12 Claims, 4 Drawing Sheets

|   |   |   |   |   |   |   |   |   |   |   |   |
|---|---|---|---|---|---|---|---|---|---|---|---|
|   | TABLE I SELECTED |   | TABLE I SELECTED |   | TABLE I SELECTED |   | TABLE II SELECTED |   |   |
|   |   |   |   |   |   |   |   |   |   |   |   |
|   | TABLE I SELECTED |   | TABLE II SELECTED |   | TABLE II SELECTED |   | TABLE I SELECTED |   |   |
|   |   |   |   |   |   |   |   |   |   |   |   |
FIG.2
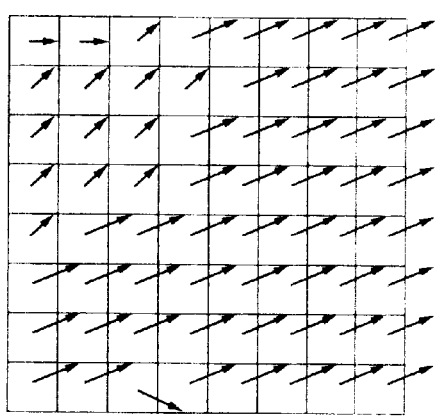
FIG.3A
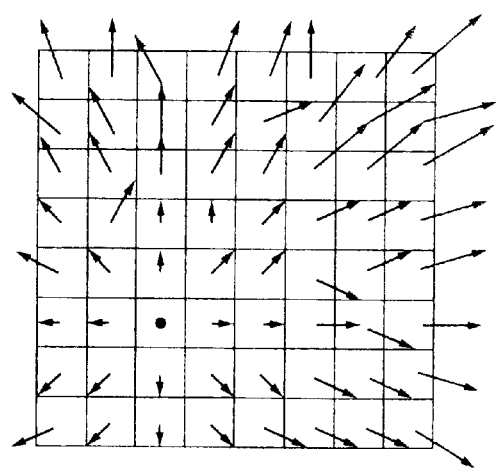
FIG.3B

APPARATUS AND METHOD OF MOTION-COMPENSATED PREDICTIVE CODING

BACKGROUND OF THE INVENTION

The present invention relates to highly efficient coding of analog moving picture signals to digital signals with a small amount of codes for efficient data transfer, storage and displaying. Particularly, this invention relates to motion-compensated coding of moving picture signals with motion vector variable encoding.

Moving picture signals are generally encoded by motion-compensated prediction according to encoding standards such as MPEG standards.

Motion vectors (MV) used for motion-compensated prediction are also encoded by variable-length coding and then multiplexed with codes of predictive error signals. Bit streams of multiplexed codes are transferred to decoders, stored into storage media or displayed on screen.

MV encoding is carried out by taking differences between motion vectors in a block of a moving picture signal and those in an adjacent block, and encoding the differences in horizontal and vertical directions by using variable-length codes. The variable-length codes consists of, for example, Huffman codes according to the frequency (the number of times) of generation of motion vector differences.

MV encoding generally uses one code table for variable-length encoding. The code table is composed of variable-length codes in accordance with MV difference distribution (probability of generation of each MV difference). MV differences have a big difference to each other according to motion of pictures, and MV difference distribution does not match a coding table depending on portions of a picture, thus increasing the amount of codes of motion vectors. Furthermore, the smaller the block of moving picture signal in motion compensation for high accuracy, the more the codes of motion vectors in the total amount of generated codes.

SUMMARY OF THE INVENTION

A purpose of the present invention is to provide an apparatus and a method of motion-compensated predictive coding of moving picture signals with motion vector variable coding for less generation of codes of motion vectors.

Another purpose of the present invention is to provide an apparatus and a method of motion-compensated predictive decoding of encoded moving picture signals and motion vectors.

The present invention provides an apparatus for encoding a moving picture signal by motion-compensated prediction using motion vectors for each motion-compensated block of the moving picture signal. The apparatus includes a vector grouping unit, a motion vector encoder and a multiplexer. The vector grouping unit arranges the motion vectors into motion vector groups for each predetermined number of motion vectors; a code table selector to select a code table among a plurality of code tables for each motion vector group for encoding the motion vectors and to output code table selection information. The motion vector encoder encodes the motion vectors by variable-length coding using the selected code table in response to the code table selection information. The multiplexer multiplexes the code table selection information and the encoded motion vectors.

Furthermore, the present invention provides a method of encoding a moving picture signal by motion-compensated prediction using motion vectors for each motion-compensated block of the moving picture signal. The motion vectors are arranged into motion vector groups for each predetermined number of motion vectors. A code table is selected among a plurality of code tables for each motion vector group for encoding the motion vectors and code table selection information is output. The motion vectors are encoded by variable-length coding using the selected code table in response to the code table selection information. The code table selection information and the encoded motion vectors are multiplexed.

The present invention further provides an apparatus for decoding a moving picture bit stream that has been encoded by motion-compensated prediction using motion vectors for each motion-compensated block of the moving picture. The apparatus includes a demultiplexer and a motion vector. The demultiplexer demultiplexes the moving picture bit stream into the motion vectors and code table selection information, the motion vectors having been encoded by variable-length coding using a code table selected among a plurality of code tables for each motion vector group in accordance with the code table selection information, the motion vectors having been arranged into motion vector groups for each predetermined number of motion vectors. The motion vector decoder decodes the motion vectors obtained by demultiplexing by variable-length decoding using the code table selected in accordance with the code table selection information obtained by demultiplexing.

Moreover, the present invention provides a method of decoding a moving picture bit stream that has been encoded by motion-compensated prediction using motion vectors for each motion-compensated block of the moving picture. The moving picture bit stream is demultiplexed into the motion vectors and code table selection information, the motion vectors having been encoded by variable-length coding using a code table selected among a plurality of coding tables for each motion vector group in accordance with the code table selection information, the motion vectors having been arranged into motion vector groups for each predetermined number of motion vectors. The motion vectors obtained by demultiplexing are decoded by variable-length decoding using the code table selected in accordance with the code table selection information obtained by demultiplexing.

BRIEF DESCRIPTION OF DRAWINGS

FIG. 2 illustrates motion vector groups arranged in two-dimension;

FIG. 3A illustrates motion vectors with small change;

FIG. 3B illustrates motion vectors with large change;

DETAILED DESCRIPTION OF PREFERRED EMBODIMENTS

Preferred embodiments according to the present invention will be described with reference to the attached drawings.

[The First Preferred Embodiment of Encoder]

Figure 1:
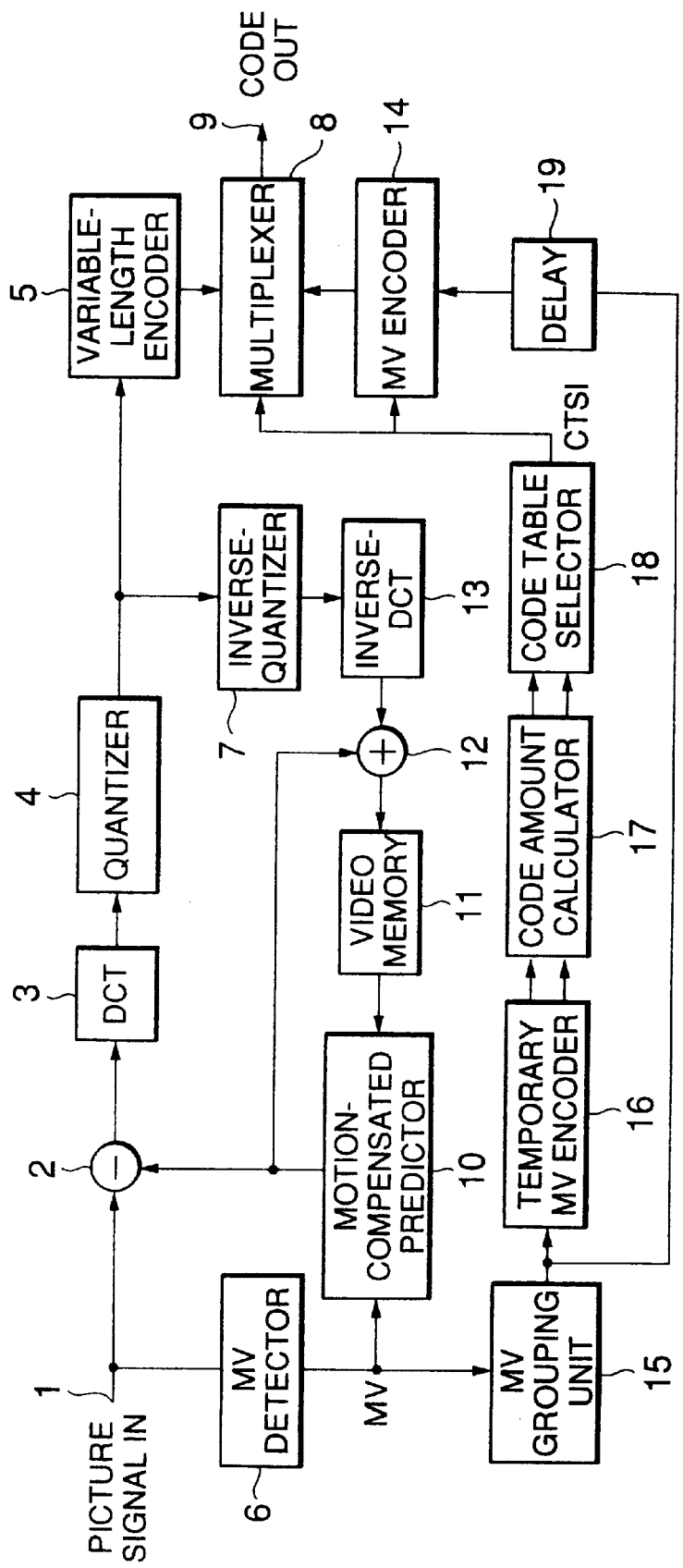
FIG. 1 shows a block diagram of the first preferred embodiment of an encoding apparatus according to the present invention.

Shown in FIG. 1 is a block diagram of the first preferred embodiment of a motion-compensated predictive encoding apparatus according to the present invention.

An input moving picture signal is supplied to a subtractor 2 through an input terminal 1. Also supplied to the subtractor 2 is a predictive signal from a motion-compensated predictor 10. The predictive signal is subtracted from the input moving picture signal to produce a predictive error signal.

The predictive error signal is supplied to a Discrete Cosign Transformer (DCT) 3 and transformed into DCT coefficients. The DCT coefficients are supplied to a quantizer 4 that quantizes the DCT coefficients at a predetermined stepsize to generate fixed-length codes of the predictive error signal. The generated fixed-length codes are supplied to a variable-length encoder 5 and an inverse-quantizer 7.

The variable-length encoder 5 encodes the fixed-length codes of the predictive error signal to variable-length codes. A bit stream of the variable-length codes is supplied to a multiplexer 8.

The fixed-length codes supplied to the inverse-quantizer 7 are processed and supplied to an inverse-DCT 13 that reproduces the predictive error signal. The operations of the inverse-quantizer 7 and the inverse-DCT 13 are the inverse of the quantizer 4 and the DCT 3, respectively. The reproduced predictive error signal is supplied to an adder 12. The adder 12 adds the predictive error signal and the predictive signal supplied from the motion-compensated predictor 10 to reproduce the moving picture (video) signal.

The reproduced video signal is once stored in a video memory 11. The stored video signal is supplied to the motion-compensated predictor 10. The predictor 10 processes the video signal by motion compensation according to motion vectors MVs supplied from an MV detector 6 to generate the predictive signal that is then supplied to the subtractor 2 and the adder 12.

The MV detector 6 obtains spatial movement of a reference frame with respect to a frame to be coded for each 16×16 or 8×8 pixel block of the input moving picture signal. The spatial movement is supplied as the motion vectors MVs to the motion-compensated predictor 10 and also to an MV grouping unit 15.

The MV grouping unit 15 that is one of the features according to the present invention will be disclosed in detail.

The MV grouping unit 15 arranges motion vectors MVs for every 16 to 64 vectors, for example, into MV groups. Each MV group preferably consists of a 4×4 motion vector block in two-dimension such as shown in FIG. 2 according to the encoding characteristics of the encoding apparatus of FIG. 1. The motion vectors MVs are converted into two-dimensional arrangement by using a memory that stores the motion vectors MVs. Not only this, each MV group may be one-dimensional, for example, 16 motion vectors being arranged on a horizontal one line. Described later in detail, but TABLE I or II having variable-length codes is selected for encoding motion vectors MVs.

Each motion vector MV of the MV group is supplied from the MV grouping unit 15 to a temporary MV encoder 16 and a delay unit 19. The encoder 16 encodes each motion vector temporarily according to all the code tables installed into an MV encoder 14 to generate bit streams by encoding using variable-length codes of each code table. The bit streams are supplied to a code amount calculator 18.

TABLES I and II shown below are examples of the code tables.

The first variable-length code table shown in TABLE I is preferably used for encoding motion vectors MVs with small change such as motion vectors illustrated in FIG. 3A. On the other hand, the second variable-length code table shown in TABLE II is preferably used for encoding motion vectors MVs with large change such as motion vectors illustrated in FIG. 3B. The sign "s⇆" attached to each variable-length code in TABLES I and II indicates positive "+" or negative "−". The variable-length codes are used in encoding motion vectors MVs for both horizontal and vertical MV components of MV difference values. The variable-length codes may be used in encoding integers of motion vectors MVs that are obtained by multiplying the motion vectors by two when the motion vectors are of ½ accuracy.

The First Variable-Length Code Table

TABLE I

| MV Difference Value | Variable-length Code |
|---|---|
| 0 | 1 |
| 1 | 01s |
| 2 | 001s |
| 3 | 00011s |
| 4 | 000101s |
| 5 | 000100s |
| 6 | 0000111s |
| 7 | 0000110s |
| 8 | 0000101s |
| 9 | 0000100s |
| 10 | 0000011s |
| 11 | 00000101s |
| 12 | 00000100s |
| 13 | 00000011s |
| 14 | 00000010s |
| 15 | 00000001s |

The Second Variable-Length Code Table

TABLE II

| MV Difference Value | Variable-length Code |
|---|---|
| 0 | 11 |
| 1 | 10s |
| 2 | 011s |
| 3 | 0101s |
| 4 | 0100s |
| 5 | 00111s |
| 6 | 00110s |
| 7 | 00101s |
| 8 | 00100s |
| 9 | 000111s |
| 10 | 000110s |
| 11 | 000101s |
| 12 | 000100s |
| 13 | 000011s |
| 14 | 000010s |
| 15 | 000001s |

Code amounts of the bit streams generated by using each variable-length code table are calculated by the code amount calculator 17. The code amounts are supplied to a code table selector 18 for each MV group. The bit streams generated by the temporary MV encoder 16 may not be so complete because code amounts are only needed. For this reason, a code length for each MV difference value may be output by the temporary MV encoder 16 and accumulated by the code amount calculator 17 for each MV group.

The code table selector 18 compares the code amounts calculated by the code amount calculator 17 according to TABLES I and II, and selects either TABLE I or II for which the code amount is less than the other. Code table selection information (CTSI) indicating the selected table is output by the selector 18 and supplied to the MV encoder 14 and also the multiplier 8.

Each motion vector MV of the MV groups is delayed by the delay unit 19 before being supplied to the MV encoder 14 until the code table selection information is output.

The MV encoder 14 takes a difference between each motion vector and the preceding motion vector and encodes the difference value by the variable-length codes of one of plurality of code tables such as shown in TABLE I or II. The code table is selected for each MV group as shown in FIG. 2 in accordance with the code table selection information.

The encoded difference value, or MV code is supplied to the multiplexer 8 and then multiplexed with predictive error signal sent from the variable-length encoder 5, the code table selection information being added to the header of the encoded MV code. The multiplexer 8 outputs the multiplexed bit stream through an output terminal 9.

Two code tables are provided in this embodiment. However, a plurality of tables more than two are provided according to the present invention according to different MV difference generation distributions. A code table appropriate to an MV group is selected even if an MV difference distribution in the MV group has a big difference to an average distribution.

The selected code table consists of variable-length codes appropriate to the MV difference distribution in the MV group. Code amounts of the MV group will thus be smaller than those of an average code table. Furthermore, a code table appropriate to each MV group is selected, so that the total code amount will be decreased even though code table selection information is included. Because the selection information consists of one or two bits only for each MV group.

[The Second Preferred Embodiment of Encoder]

Figure 4:
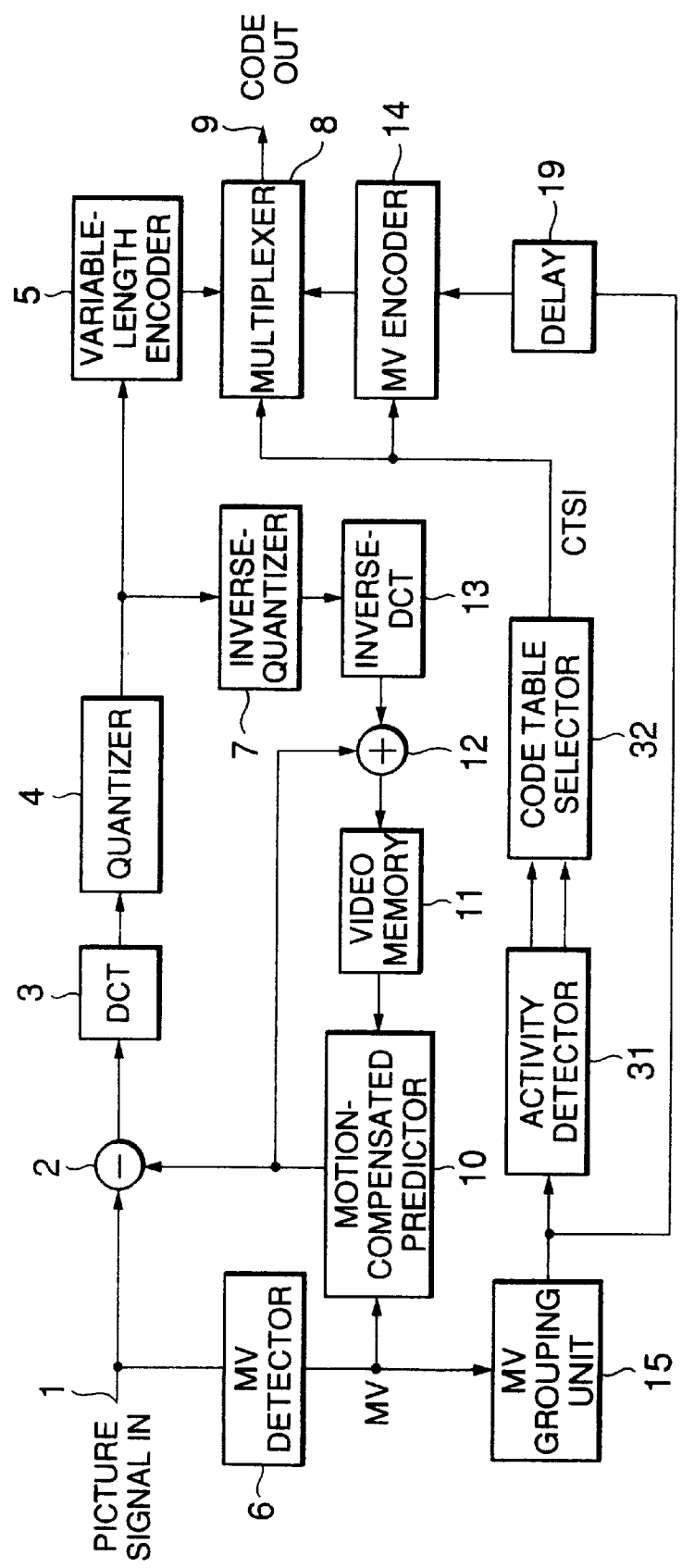
FIG. 4 shows a block diagram of the second preferred embodiment of an encoding apparatus according to the present invention.

Shown in FIG. 4 is a block diagram of the second preferred embodiment of a motion-compensated predictive encoding apparatus according to the present invention. Elements in the second embodiment that are the same as or analogous to elements in the first embodiment are referenced by the same reference numerals and will not be explained in detail.

Differences between the first and the second embodiments are: the former has the temporal MV encoder 16 and the code amount calculator 17, whereas the latter has an activity detector 31; and the function of the code table selector 18 and that of a code table selector 32 are different from each other.

The second preferred embodiment is disclosed only for the differences.

Each motion vector MV of MV groups is supplied to the activity detector 31 from the MV grouping unit 15. Activity of the motion vector MV is detected by the detector 31 and supplied to the code table selector 32. The activity is detected for each MV group as addition of the absolute values of MV difference values. Logarithmic conversion of the absolute values of MV difference values before addition will give MV difference values higher correlation to MV code amounts, thus improving encoding efficiency.

The code table selector 32 selects an appropriate code table among a plurality of code tables installed in the MV encoder 14 according to the relationship between the input activity and a predetermined reference threshold level. The same as the first embodiment, the MV encoder 14 of the second embodiment has the code tables such as shown in TABLES I and II.

The input activity is compared with the reference threshold level, or reference activity that has an intermediate level. TABLE I is selected if the input activity is smaller than the reference threshold level. On the other hand, TABLE II is selected if the input activity is larger than the reference threshold level.

The activity is detected as addition of the absolute values of MV difference values in this embodiment. However, not only this, activity may be detected as two-dimensional to accurately represent MV difference distribution. For example, the frequency (the number of times) the generation of MV differences relatively small but not zero such as the absolute value of 1 to 3 and that of the generation of MV differences relatively large such as the absolute value of 4 or more may be detected as two parameters. Reference threshold levels are then provided two-dimensionally with respect to the two parameters.

[The Third Preferred Embodiment of Encoder]

The third preferred embodiment of a motion-compensated predictive encoding apparatus according to the present invention will be disclosed with no drawing.

The third embodiment of the encoding apparatus is the combination of the first and the second embodiments. In detail, the motion-compensated predictive encoding apparatus in the third embodiment includes a temporal encoder and a code amount calculator that are similar to the temporal encoder 16 and the code amount calculator 17, respectively, shown in FIG. 1. The encoding apparatus in the third embodiment is further provided with a code table selector that is similar to the code table selector 32 shown in FIG. 4.

The temporal encoder and code amount calculator of this embodiment calculate a code amount for each MV group according to one code table. The code table has an average MV difference variation such as one in between the TABLES I and II.

The calculated code amount is supplied to the code table selector of this embodiment. The code table selector selects a code table such as shown in TABLE I or II in accordance the relationship between the calculated code amount and a predetermined reference threshold level and outputs code table selection information (CTSI). TABLE I with small variation of MV differences is selected if the code amount is smaller than the reference threshold level. On the other hand, TABLE II with large variation of MV differences is selected if the code amount is larger than the reference threshold level.

[Preferred embodiment of Decoder]

Figure 5:
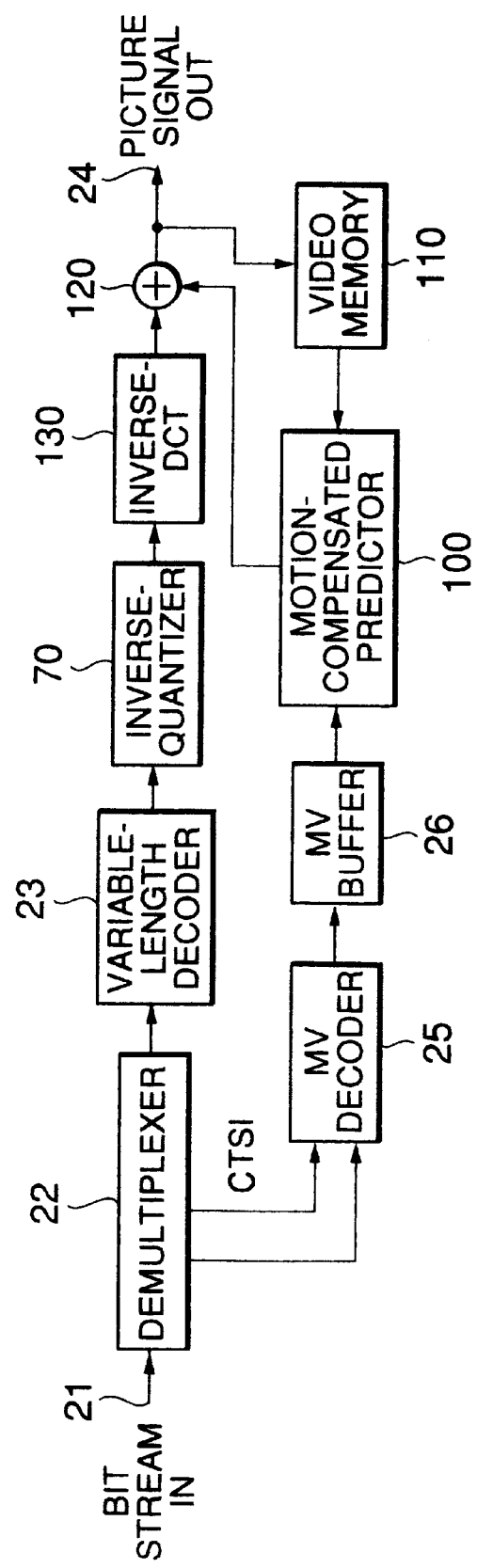
FIG. 5 shows a block diagram of a preferred embodiment of a decoding apparatus according to the present invention.

Next, a preferred embodiment of a motion-compensated predictive decoding apparatus that will accept a bit stream output from a encoding apparatus such as that of the first, the second or the third embodiment will be disclosed with reference to FIG. 5.

A bit stream that has been encoded by motion-compensated predictive coding is supplied to a demultiplexer 22 through an input terminal 21. The bit stream is separated into variable-length codes of predictive error signal, MV codes and code table selection information (CTSI).

The variable-length codes of predictive error signal are supplied to a variable-length decoder 23. On the other hand, the MV codes and code table selection information are supplied to an MV decoder 25.

The variable-length codes of predictive error signal are converted into fixed-length codes by the variable-length decoder 23 and supplied to an inverse-quantizer 70. The fixed-length codes are converted into 8×8 number of DCT coefficients and supplied to an inverse-DCT 130.

The DCT coefficients are inversely transformed to reproduce a predictive error signal that is then supplied to an adder 120. Also supplied to the adder 120 is a predictive signal from a motion-compensated predictor 100. The predictive error signal and the predictive signal are added to reproduce a moving picture signal.

The moving picture signal is output through an output terminal 24, and also supplied and stored into a video memory 110. The stored moving picture signal is motion-compensated by the motion-compensated predictor 100 to generate the predictive signal that is supplied to the adder 120.

The motion-compensation is carried out on the basis of motion vectors MVs supplied from an MV buffer 26. The motion vectors MVs stored in the MV buffer 26 are obtained by the MV decoder 25 to carry out decoding on the MV codes by variable-length codes of one of code tables for each MV group. The MV decoder 25 has a plurality of code tables that consist of variable-length codes the same as those such as shown in TABLES I and II. And, one code table is selected in accordance with code table selection information. The decoding is the inverse of encoding by the MV encoder 14 shown in FIGS. 1 and 4.

The MV buffer 26 once stores the motion vectors MVs and supplies them to the motion-compensated predictor 100 only when the predictor 100 requires them. This is because the order of blocks of predictive error signal does not match the number of motion vectors arranged into each MV group.

As disclosed above, according to the present invention, motion-compensated predictive encoding is carried out using a plurality of code tables of variable-length codes for encoding motion vectors. One code table is selected in accordance with selection information that is generated according to amount of codes or activity of motion vectors arranged into groups.

Motion-compensated predictive decoding is carried out also using the same code tables. An appropriate code table is selected for decoding in accordance with code table selection information sent from an encoder side.

A plurality of code tables are provided for different distribution of generation of MV difference. And, an appropriate code table is selected for distribution of generation of MV difference in an MV group to be encoded, thus achieving small amount of generated MV codes. The generated total code amount will be decreased because the code amount of predictive error signal does not vary. Especially, making small the block of moving picture signals for motion compensation for high accuracy will relatively increase the amount of codes of motion vectors in the total amount of generated codes. Decrease in the amount of MV codes thus contributes decrease in the total amount of generated codes.

What is claimed is:

1. An apparatus for encoding a moving picture signal by motion-compensated prediction using motion vectors for each motion compensated block of the moving picture signal, the apparatus comprising:
   a vector grouping unit to arrange the motion vectors into motion vector groups for each predetermined number of motion vectors;
   a code table selector to select a code table among a plurality of code tables each of said code tables, respectively listing motion vector difference values and the corresponding variable-length codes according to change in motion vector or activity, the motion vector difference values being shared by the code tables whereas the variable-length codes are different among the code tables for each motion vector group for encoding the motion vectors and to output code table selection information;
   a motion vector encoder, responsive to the code table selection information, to encode the motion vectors by variable-length coding using the selected code table; and
   a multiplexer to multiplex the code table selection information and the encoded motion vectors.

2. The apparatus as claimed in claim 1, wherein said code table selector selects a code table among said predetermined code tables so that the amount of the motion vectors encoded by using said selected code table is the minimum among the code tables.

3. The apparatus as claimed in claim 1, wherein the code table selector temporarily encodes the motion vectors by using all the predetermined code tables before the encoding by the motion vector encoder, thus selecting a code table by which an amount of the encoded motion vectors is the minimum among the code tables.

4. The apparatus as claimed in claim 1, wherein said code table selector detects activity of the motion vectors, thus selecting a code table among said predetermined code tables according to the detected activity.

5. The apparatus as claimed in claim 1, wherein said predetermined code tables include an average code table of an average motion vector difference variation among the plurality of types of code tables, said code table selector temporarily encodes the motion vectors by using the average code table, thus selecting a code table among said predetermined code tables according to an amount of the temporarily encoded motion vectors.

6. A method of encoding a moving picture signal by motion-compensated prediction using motion vectors for each motion compensated block of the moving picture signal, the method comprising the steps of:
   arranging the motion vectors into motion vector groups for each predetermined number of motion vectors;
   selecting a code table among a plurality of code tables, each of said code tables respectively listing motion vector difference values and the corresponding variable-length codes according to change in motion vector or activity, the motion vector difference values being shared by the code tables whereas the variable-length codes are different among the code tables for each motion vector group for encoding the motion vectors and outputting code table selection information;
   encoding the motion vectors by variable-length coding using the selected code table in response to the code table selection information; and
   multiplexing the coding table selection information and the encoded motion vectors.

7. The method as claimed in claim 6, wherein said code table selecting step includes the step of selecting a code table among said predetermined code tables so that an amount of the motion vectors encoded by using said selected code table is the minimum among the code tables.

8. The method as claimed in claim 6, wherein said code table selecting step includes the step of temporarily encoding the motion vectors by using all the predetermined code tables before the encoding by the motion vector encoder, thus selecting a code table by which an amount of the encoded motion vectors is the minimum among the code tables.

9. The method as claimed in claim 6, wherein said code table selecting step includes the step of detecting activity of the motion vectors, thus selecting a code table among the predetermined code tables according to the detected activity.

10. The method as claimed in claim 6, wherein said predetermined code tables include an average code table of an average motion vector difference variation among the plurality of types of code tables, said code table selecting step including the step of temporarily encoding the motion vectors by using the average code table, thus selecting a code table among the predetermined code tables according to an amount of the temporarily encoded motion vectors.

11. An apparatus for decoding a moving picture bit stream that has been encoded by motion-compensated prediction using motion vectors for each motion-compensated block of the moving picture, the apparatus comprising:

a demultiplexer to demultiplex the moving picture bit stream into the motion vectors and code table selection information, the motion vectors having been encoded by variable-length coding using a code table selected among a plurality of code tables, each of said code tables respectively listing motion vector difference values and the corresponding variable-length codes according to change in motion vector or activity, the motion vector difference values being shared by the code tables whereas the variable-length codes are different among the code tables for each motion vector group in accordance with the code table selection information, the motion vectors having been arranged into motion vector groups for each predetermined number of motion vectors; and a motion vector decoder to decode the motion vectors obtained by demultiplexing by variable-length decoding using the code table selected in accordance with the code table selection information obtained by demultiplexing.

12. A method of decoding a moving picture bit stream that has been encoded by motion-compensated prediction using motion vectors for each motion-compensated block of the moving picture, the method comprising the steps of:

demultiplexing the moving picture bit stream into the motion vectors and code table selection information, the motion vectors having been encoded by variable-length coding using a code table selected among a plurality of code tables, each of said code tables respectively listing motion vector difference values and the corresponding variable-length codes according to change in motion vector or activity, the motion vector difference values being shared by the code tables whereas the variable-length codes are different among the code tables for each motion vector group in accordance with the code table selection information, the motion vectors having been arranged into motion vector groups for each predetermined number of motion vectors; and decoding the motion vectors obtained by demultiplexing by variable-length decoding using the code table selected in accordance with the code table selection information obtained by demultiplexing.

* * * * *